March 14, 1933.  A. LENNING  1,901,458

REFRIGERATION

Filed May 28, 1929

INVENTOR
Alvar Lenning
BY
Wm J. Hedlund
his ATTORNEY

Patented Mar. 14, 1933

1,901,458

UNITED STATES PATENT OFFICE

ALVAR LENNING, OF JACKSON HEIGHTS, NEW YORK, ASSIGNOR TO ELECTROLUX SERVEL CORPORATION, OF NEW YORK, N. Y., A CORPORATION OF DELAWARE

REFRIGERATION

Application filed May 28, 1929. Serial No. 366,700.

My invention relates to the art of refrigeration and particularly to refrigerating apparatus wherein a constant pressure is maintained throughout by the use of an inert gas and hence no expansion or other valves are required.

In an apparatus of this type more refrigerant may, at times, be supplied to the evaporator than will evaporate at the existing temperature. This excess refrigerant passes through the evaporator in liquid form and to the absorber where it forms a solution with absorption liquid. Since the refrigerant has a lesser specific weight than the absorption liquid, the former tends to float on the latter in the absorber in the form of a film. This not only retards the formation of the solution of liquid refrigerant and absorption liquid but it also reduces the surface of the latter available for absorbing vaporous refrigerant.

It is, therefore, one of the objects of my invention to provide means for introducing the vaporous refrigerant above and the excess unevaporated refrigerant below the surface of the absorption liquid in the absorber, whereby thorough mixing of the two liquids is obtained and the formation of the aforementioned film is prevented. Further objects and advantages will appear from the following description of preferred embodiments of my invention illustrated in the accompanying drawing, on which Fig. 1 is an elevational view, chiefly in cross-section, of a refrigerating apparatus embodying a preferred form of my invention; and Fig. 2 is an enlarged view, chiefly in cross-section, of a portion of the refrigerating apparatus shown in Fig. 1 but embodying a slightly modified form of my invention.

Figure 1:
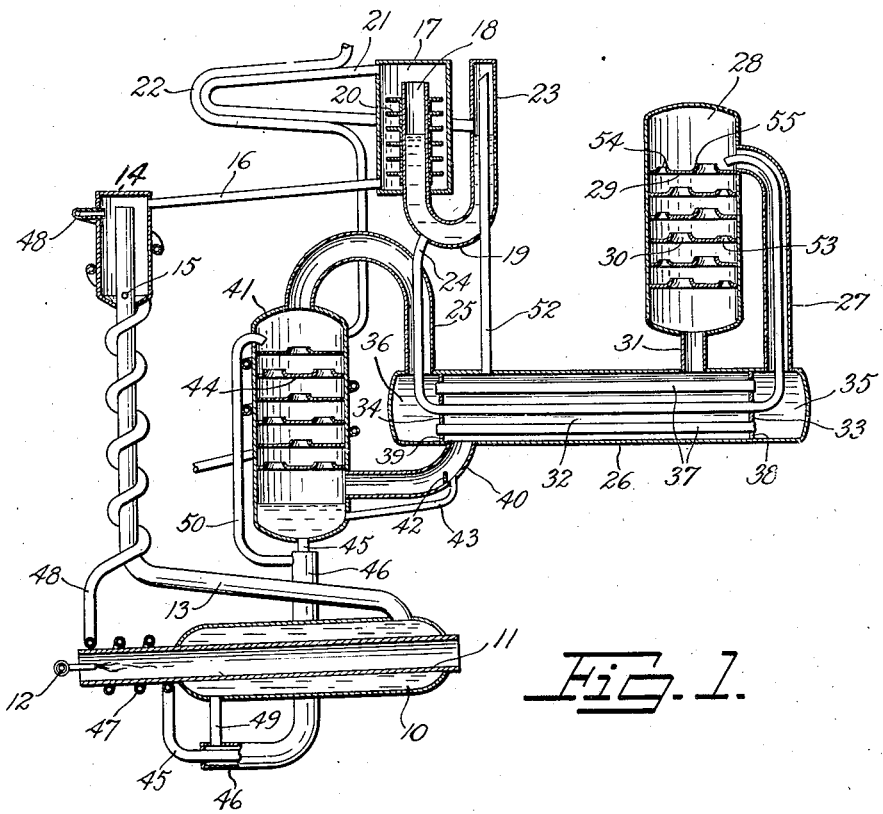
Figure 2:
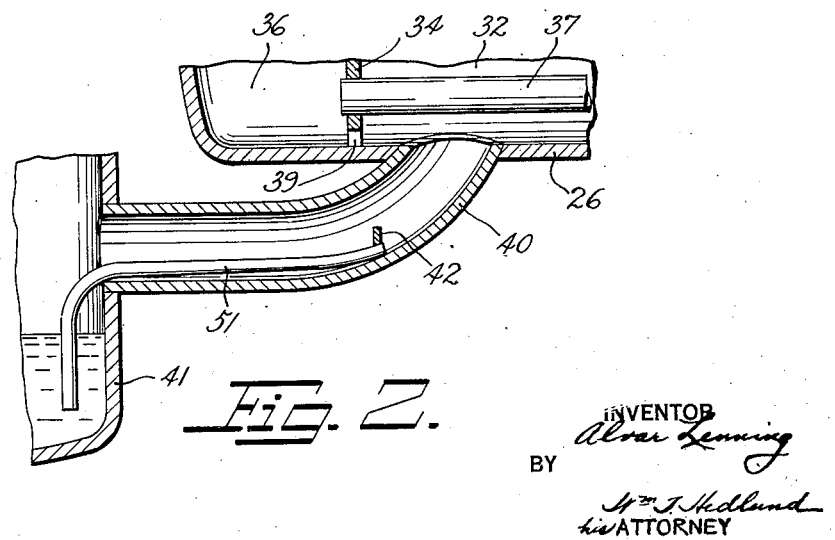

Referring more particularly to Fig. 1, reference character 10 indicates a generator which comprises a container centrally through which extends a flue 11. The flue is heated in any suitable way, as by the burner 12 arranged to project a flame thereinto. A conduit 13 of comparatively large bore communicates with the upper part of generator 10 and extends upwardly and terminates within a chamber 14. The upper end of conduit 13 is open and the conduit is also provided with several apertures 15 near the bottom of chamber 14.

A conduit 16 connects the upper part of chamber 14 with the bottom of a rectifier chamber 17. A leg 18 of a U-shaped liquid receiver 19 extends within chamber 17 and is therein provided with a series of heat transfer fins 20. A condenser conduit 21 communicates with the upper part of chamber 17 and extends in a downwardly direction in heat exchange relation with a cooling water conduit 22 and communicates with the other leg 23 of liquid receiver 19.

A conduit 24 communicates with the lower part of receiver 19, extends within a conduit 25, a heat exchanger 26 and a conduit 27 to within the upper part of an evaporator 28. The evaporator preferably comprises a cylindrical vessel in which are positioned a series of discs 29. The discs are provided with a small liquid aperture 53 surrounded by a low rim 54 and one or more larger gas apertures 30 surrounded by a higher rim 55. A conduit 31 connects the bottom of evaporator 28 with a space 32 within heat exchanger 36.

The heat exchanger comprises a cylindrical shell closed at both ends. Two tube heads 33 and 34 are secured near either end of the shell and divide the interior thereof into three spaces; namely, the central space 32 and two end spaces 35 and 36. A series of tubes 37 are secured in heads 33 and 34, extend through space 32 and establish communication between spaces 35 and 36. Small capillary ports 38 and 39 (see particularly Fig. 2) are provided in the lower edges of heads 33 and 34 respectively to allow a restricted communication between end spaces 35 and 36 and central space 32. A gas vent 52 establishes a more or less restricted communication between the upper part of leg 23 of liquid receiver 19 and space 32 in the heat exchanger.

A conduit 40 communicates with the bottom of space 32 and extends in a downwardly direction to the lower part of an absorber 41. A liquid dam 42 is placed in conduit 40 so as to obstruct the lower part of the conduit. A small liquid conduit 43 communicates with the bottom of conduit 40 a short distance above dam 42 and with absorber 41 at a point below the point of communication of conduit 40 with the absorber.

Absorber 41 preferably comprises a cylindrical vessel in which are positioned a series of discs 44 which may be similar to discs 29 in evaporator 28. Cooling water conduit 22 is wound around the outside of the absorber and is brought in heat exchange relation therewith, preferably by welding. Conduit 25 connects the upper part of absorber 41 with space 36 in heat exchanger 26 and conduit 27 connects space 35 with the upper part of evaporator 28.

A conduit 45 communicates with the bottom of absorber 41, extends within a heat exchanger jacket 46 and communicates with a thermo-syphon coil 47 which is wound around an extended end of flue 11. A thermo-syphon conduit 48 communicates with the other end of coil 47 and extends upwardly, preferably in the form of a spiral around conduit 13 and communicates with the upper part of chamber 14. A conduit 49 connects the lower part of generator 10 with one end of jacket 46 while a conduit 50 connects the other end of the jacket with the upper part of absorber 41. Conduit 50 is brought in heat exchange relation with cooling water conduit 22, preferably by welding to successive turns of the latter around the absorber.

In the modification shown in Fig. 2, in which like reference characters indicate like parts appearing in Fig. 1, conduit 43 of Fig. 1 is replaced by a conduit 51. Conduit 51 communicates with the space above dam 42 by passing through the dam instead of by passing through the side of conduit 40. Conduit 51 extends within conduit 40 to within absorber 41 and thence downwardly to near the bottom of the absorber. It will be noted that in this embodiment conduit 51 is entirely within other parts of the apparatus and hence two outside welds, occurring at either end of conduit 43 in Fig. 1, are eliminated.

The operation of the apparatus is substantially as follows: A solution of a refrigerant, for instance ammonia, dissolved in an absorption medium, such as water, is contained within generator 10. The application of heat from burner 12 causes the ammonia to be driven from solution in the form of a vapor and it passes upwardly through conduit 13 to within gas separation chamber 14. From here the ammonia, with a small percentage of water vapor, passes through conduit 16 to within rectifier chamber 17. Within the rectifier the temperature of the vapors is reduced sufficiently to condense the water vapor, which runs back through conduit 16, but not low enough to condense the ammonia. The practically pure ammonia vapor passes from chamber 17 into condenser conduit 21 where its temperature is further reduced by the cooling water in conduit 22 and it is liquefied and runs into liquid receiver 19, which it fills up to approximately the level of the highest point of conduit 24 in evaporator 28. It is the liquid ammonia in leg 18 of receiver 19 that effects the rectification of the mixed vapors of ammonia and water in chamber 17.

The liquid ammonia passes from receiver 19 through conduit 24 to within the upper part of evaporator 28. A gas, inert with respect to ammonia, for instance hydrogen, is introduced into the evaporator through conduit 27 and comes in intimate contact with the liquid ammonia, which is retained in thin layers on discs 29 by rims 54 and 55 around apertures 53 and 30 respectively. The ammonia evaporates in the presence of, and diffuses into, the hydrogen and the accompanying drop in temperature produces refrigeration.

The amount of ammonia that will evaporate into the hydrogen is dependent upon the temperature, decreasing as the temperature falls. Hence, when the temperature within the evaporator is reduced to or below a certain value more liquid ammonia may be supplied to the evaporator than can evaporate therein and hence a portion passes through in liquid form.

The gaseous mixture of ammonia and hydrogen and any unevaporated liquid ammonia passes from the bottom of evaporator 28 through conduit 31 to within space 32 in heat exchanger 26. The heat exchanger may be inclined slightly so that the liquid ammonia will flow along the bottom thereof to conduit 40. The gasses and liquid pass into conduit 40, the liquid, of course, flowing along the bottom thereof until it is stopped by dam 42, while the gasses pass over the dam and into absorber 41 above the liquid level therein. The liquid stopped by dam 42 passes into conduit 43 and is introduced into the absorber below the liquid level therein. Thus, a thorough mixing of the liquid ammonia and the absorption liquid within the absorber is assured, whereas if the liquid ammonia were permitted to enter the absorber through conduit 40, it would have a tendency to float as a film on the surface of the absorption liquid therein.

The gaseous mixture of ammonia and hydrogen which enters the absorber through conduit 40 is brought in intimate contact with weak absorption liquid which is introduced through conduit 50 and which is distributed over discs 44. The ammonia gas is absorbed by this liquid while the lighter hydrogen is not absorbed and passes upwardly through the absorber and through conduit 25 to space 36 in heat exchanger 26. From here it passes through tubes 37 to space 35 and thence through conduit 27 to evaporator 28. In the heat exchanger the hydrogen gas in tubes 37 and the liquid ammonia in conduit 24 is cooled by the ammonia and hydrogen in space 32.

The strong solution of ammonia in water formed in the absorber passes therefrom through conduit 45 to thermo-siphon coil 47. Here it is heated and some of the ammonia driven from solution in the form of a vapor, and this vapor, by thermo-siphon or percolator action, raises the remaining liquid through thermo-syphon conduit 42 to chamber 14. The liquid passes from this chamber through apertures 15 into conduit 13 and through this conduit to generator 10. In the generator, as previously described, more ammonia is driven from solution and this vapor bubbles up through the liquid in conduit 13 and in chamber 14 joins the vapor discharged from conduit 48 and together they pass into conduit 16.

Weak absorption liquid flows from the bottom of generator 10 through conduit 49 to jacket 46 and from the jacket through conduit 50 to absorber 41. The hot weak liquid in jacket 46 is in heat exchange relation with the cooler strong liquid in conduit 45 and is further cooled by the cooling water in conduit 22 around the absorber. The flow of absorption liquid from the generator to the absorber takes place due to gravity as conduit 48 discharges into chamber 14 at a level above the point of discharge of conduit 50 into absorber 41.

The operation of the apparatus shown in Fig. 2 is substantially the same as that of the corresponding apparatus in Fig. 1. The unevaporated liquid ammonia which enters conduit 40 from space 32 in heat exchanger 26 is stopped by dam 42 and flows through conduit 51 to below the liquid level in absorber 41 and is thereby well mixed with the absorption liquid in the absorber.

While I have illustrated and described two more or less specific embodiments of my invention, it is to be understood that modifications thereof, which will be apparent to one skilled in the art to which it pertains, fall within its scope which is to be limited only by the appended claims viewed in the light of the prior art.

What I claim is:

1. In an absorption refrigerating apparatus, a generator, a condenser, an evaporator and an absorber, means to supply liquid refrigerant to the evaporator, means to circulate an absorption liquid between and through said generator and absorber, a gas conduit for conducting vaporous refrigerant from said evaporator and introducing the same above the liquid level in said absorber refrigerant from the evaporator, and a branch conduit connected to said gas conduit for withdrawing unevaporated refrigerant from said gas conduit and introducing the unevaported refrigerant below said liquid level in the absorber.

2. In an absorption refrigerating apparatus, a generator, a condenser, an evaporator, an absorber and means interconnecting said members, one of the means connecting said evaporator with said absorber comprising a first conduit extending downwardly toward and communicating with the absorber, a dam in said first conduit arranged to obstruct flow of liquid along the bottom thereof and a second conduit communicating with said first conduit forward of the dam in the line of flow and communicating with said absorber at a lower point than the point of communication of said first conduit with the absorber.

3. That improvement in the art of refrigerating with the aid of an absorption system comprising a generator, a condenser, an evaporator and an absorber, which consists in conducting a mixture of vaporous refrigerant and an inert gas from the evaporator to the absorber, maintaining a body of liquid in the absorber, conducting excess unevaporated refrigerant from the evaporator to the absorber in the presence of the gaseous mixture, separating the unevaporated refrigerant from the gaseous mixture during the passage of the fluids from the evaporator to the absorber, introducing the unevaporated refrigerant into said body of liquid and introducing the gaseous mixture into the absorber above said body of liquid.

4. Refrigerating apparatus of the absorption type comprising a generator, a condenser, an evaporator and an absorber interconnected by conduits including a conduit for conducting evaporated refrigerant from the evaporator to the absorber, said conduit being connected to the evaporator to receive unevaporated refrigerant fluid therefrom and connected to the absorber above the normal liquid level therein, and means for separating liquid refrigerant from vaporous refrigerant in said conduit including a branch conduit for introducing the separated liquid into the absorber below the normal level of liquid therein.

5. Refrigerating apparatus of the absorption type comprising a generator, a condenser, an evaporator and an absorber interconnected by conduits including a conduit for conducting evaporated refrigerant from the evaporator to the absorber, said conduit being connected to the evaporator to receive unevaporated refrigerant fluid therefrom and connected to the absorber above the normal liquid level therein, and means for separating liquid refrigerant from vaporous refrigerant in said conduit including a dam and a branch conduit for conducting the separated liquid from the vicinity of the dam into the absorber below the normal level of liquid therein.

6. In an absorption refrigerating apparatus, a generator, a condenser, an evaporator and an absorber connected in series, means to circulate a refrigerant therethrough, means to circulate an absorption liquid between and through said absorber and generator, means to circulate an inert gas between and through said evaporator and absorber including a conduit for conducting a mixture of inert gas and vaporous refrigerant from a relatively low point in said evaporator to a relatively low point in said absorber and to introduce the same above the liquid level in the absorber and to convey liquid refrigerant from the evaporator toward the absorber, and a branch conduit for introducing the liquid refrigerant below the liquid level in the absorber.

7. In an absorption refrigerating apparatus, a generator, a condenser, an evaporator and an absorber, means to supply liquid refrigerant and an inert gas to the evaporator, means to circulate an absorption liquid between and through said generator and absorber, a gas conduit for conducting vaporous refrigerant and inert gas from said evaporator and introducing the same above the liquid level in the absorber and adapted to receive excess unevaporated refrigerant from the evaporator, and a branch conduit connected to said gas conduit for withdrawing the unevaporated refrigerant from said gas conduit and introducing the unevaporated refrigerant below said liquid level in the absorber.

8. In an absorption refrigerating apparatus, a generator, a condenser, an evaporator and an absorber, means to supply liquid refrigerant to the evaporator, means to circulate an absorption liquid between and through said generator and absorber, a gas conduit for conducting vaporous refrigerant from said evaporator and introducing the same above the liquid level in said absorber and adapted to receive excess unevaporated refrigerant from the evaporator, and a branch conduit connected to said gas conduit for withdrawing unevaporated refrigerant from said gas conduit and introducing the unevaporated refrigerant below said liquid level in the absorber, said branch conduit being wholly within said gas conduit and said absorber.

9. In an absorption refrigerating apparatus, a generator, a condenser, an evaporator, an absorber and means interconnecting said members, one of the means connecting said evaporator with said absorber comprising a first conduit extending downwardly toward and communicating with the absorber, a dam in said first conduit arranged to obstruct flow of liquid along the bottom thereof and a second conduit communicating with the space in said first conduit forward of the dam in the line of flow and communicating with said absorber at a lower point than the point of communication of said first conduit with the absorber, said second conduit being wholly within said first conduit and said absorber.

In testimony whereof I have affixed my signature.

ALVAR LENNING.